US012712346B2

(12) United States Patent
Kreft

(10) Patent No.: US 12,712,346 B2
(45) Date of Patent: Aug. 18, 2026

(54) ELECTRICAL INSTALLATIONS AND METHODS OF USE

(71) Applicant: Wade Kreft, Tippecanoe, IN (US)

(72) Inventor: Wade Kreft, Tippecanoe, IN (US)

( * ) Notice: Subject to any disclaimer, the term of this patent is extended or adjusted under 35 U.S.C. 154(b) by 272 days.

(21) Appl. No.: 18/607,074

(22) Filed: Mar. 15, 2024

(65) Prior Publication Data

US 2025/0293498 A1 Sep. 18, 2025

(51) Int. Cl.
*H02G 5/08* (2006.01)
*H02G 3/08* (2006.01)
*H02G 3/16* (2006.01)

(52) U.S. Cl.
CPC ............... *H02G 3/083* (2013.01); *H02G 3/16* (2013.01); *H02G 5/08* (2013.01)

(58) Field of Classification Search
CPC ............. H02G 3/083; H02G 3/16; H02G 5/08
USPC ........................................................ 174/53
See application file for complete search history.

(56) References Cited

U.S. PATENT DOCUMENTS 2,427,965 A 9/1947 Henderson
3,354,259 A 11/1967 Cagin
3,716,651 A * 2/1973 Werner ................ H01R 25/006 174/59
3,879,101 A * 4/1975 McKissic ................. H01H 1/58 439/535
4,035,052 A 7/1977 Marrero
4,612,412 A 9/1986 Johnston
5,735,710 A 4/1998 Blaauboer et al.
5,925,850 A 7/1999 Park
6,186,825 B1 * 2/2001 Bogiel .................. H02G 3/128 439/532

(Continued)

FOREIGN PATENT DOCUMENTS

WO 2022109074 5/2022

OTHER PUBLICATIONS

Parsons, R.S. "Outlet Box, Electric Conductor" U.S. Pat. No. 845,974. Patented Mar. 5, 1907 (Due to the amount of numbers in this patent, this document would not permit us to enter the above patent into the appropriate section above entitled US Patents).

*Primary Examiner* — Timothy J Thompson
*Assistant Examiner* — Michael F Mcallister
(74) *Attorney, Agent, or Firm* — Hartman Global IP Law; Gary M. Hartman; Domenica N.S. Hartman

(57) ABSTRACT

Electrical installations and methods for their installation and use. Such an installation includes an electrical box, an electrical distribution unit associated with the box, an electrical component (for example, an outlet, switch, light bulb, or connected wiring), and an electrical connector for coupling wires to the electrical distribution unit through a wall of the box. The electrical distribution unit allows the wires to be electrically coupled with connectors of the electrical distribution unit and the electrical component to engage the connectors within the box. The installation and its box are intended to provide the same or similar functionality as existing electrical boxes for outlets, switches, and junction boxes while eliminating the requirement to route electrical wires through and into the interior of the box itself, as such wires are replaced by the electrical distribution unit into which the wires and electrical component are plugged.

20 Claims, 10 Drawing Sheets

(56) References Cited

U.S. PATENT DOCUMENTS

| | | | | |
|---|---|---|---|---|
| 6,259,023 | B1 | 7/2001 | Reiker | |
| 6,544,049 | B1 | 4/2003 | Pierson, Jr. | |
| 6,558,190 | B1 | 5/2003 | Pierson, Jr. | |
| 6,617,511 | B2 * | 9/2003 | Schultz | H01R 27/00 174/53 |
| 6,786,766 | B1 | 9/2004 | Chopra | |
| 7,265,291 | B1 * | 9/2007 | Gorman | H02G 3/14 439/536 |
| 9,541,911 | B2 | 1/2017 | Elberbaum | |
| 9,825,447 | B1 | 11/2017 | Gorman | |
| 9,899,819 | B1 * | 2/2018 | Holloway | H01R 9/2675 |
| 9,960,580 | B1 | 5/2018 | Ruggiero | |
| 9,991,636 | B2 | 6/2018 | Derousse | |
| 11,038,297 | B2 | 6/2021 | Audy | |
| 11,070,040 | B1 | 7/2021 | Garrasi | |
| 2006/0216988 | A1 | 9/2006 | Scott | |
| 2008/0013909 | A1 * | 1/2008 | Kostet | G02B 6/4477 398/115 |
| 2012/0302091 | A1 | 11/2012 | Grissom | |
| 2017/0077690 | A1 * | 3/2017 | Moss | H02G 3/18 |
| 2020/0321736 | A1 | 10/2020 | Waynick et al. | |
| 2021/0104855 | A1 * | 4/2021 | Bayard | H01R 33/88 |

* cited by examiner 42B
28
16
34
34
42B
16
30

42B
28
34
34
42B
16
30

12
22
44
24
44
55
56

22
44
44
24
55
12

ELECTRICAL INSTALLATIONS AND METHODS OF USE

CROSS-REFERENCE TO RELATED APPLICATIONS

This application claims the benefit of U.S. Provisional Application No. 63/490,828, filed Mar. 17, 2023, the contents of which are incorporated herein by reference.

BACKGROUND OF THE INVENTION

The invention generally relates to electrical wiring, hardware, and related components and devices suitable for use in residential, commercial, and industrial settings. The invention particularly relates to electrical installations and methods for their installation and use.

Electrical outlets (e.g., receptacles, sockets, etc.) and switches are ubiquitous in households, workplaces, and buildings throughout the world. As used herein, the term "electrical box" or simply "box" will be used to refer to those in which electrical outlets and electrical switches can be installed for, respectively, receiving connectors (i.e., plugs) of electrical equipment to deliver electrical current to the equipment and controlling the flow of electricity to lights, outlets, etc., within an electrical circuit in which the switch is installed. As a matter of convenience, an assembly comprising an electrical outlet, switch, or other electrical component installed in an electrical box will be referred to herein as an electrical installation.

Outlets and switches commonly found in homes and workplaces function by allowing power from an electrical power source, provided by wiring, to connect with appliances and other electrically-powered device (hereinafter, "appliances" as a matter of convenience), thereby enabling appliances to become useful to an unskilled user. Outlets and switches may be manufactured to meet various standards. As a nonlimiting example, outlets can be adapted to receive National Electronic Manufacturers Association (NEMA) Type A and Type B connectors, to allow a standardized manner by which electrical equipment, for example, electronics and electrical appliances, may be plugged into the wiring and power infrastructure of a home, workplace, or other location.

An electrical box in which an outlet and/or switch can be installed is typically adapted to mount within a space cut or otherwise provided into a wall or other surface, provides means for mounting an outlet or switch within its interior, and allows electrical wiring of a building to enter its interior to supply electrical power to the outlet or switch. Such electrical box designs present several issues. Connecting wires into the back of an electrical box and directly into the back of an electrical outlet or switch requires cutting wires to a certain length, capping wires such that they can connect to the outlet or switch, and possibly tying wires in a manner that ensures organization, safety, and effective function. The installation of an electrical box and its outlet or switch therefore requires a certain threshold of skill and knowledge in order to safely and successfully install the electrical box and ensure correct wiring. Furthermore, the internal volume within the electrical box required to organize wires and connect them to the outlet or switch further requires the electrical box to be of a certain depth and occupy some of the limited space within walls or behind surfaces. Finally, current electrical boxes present safety hazards associated with incorrect wiring, mishandling of wires, and installation issues.

Despite the relatively high threshold of professional skill required to install and modify electrical installations (outlets and switches), installation and modification of electrical installations remains a commonplace task accomplished by both amateurs and professionals alike. Current designs incur both a risk to the user and a significant investment of time to wire and install properly. Therefore, it would be advantageous to provide electrical installations and method by which electrical power and wiring can be connected to outlets, switches, or other electrical components in a manner which is safer, more time-effective, conserves space, and simplifies the skill level required to perform such installations.

BRIEF SUMMARY OF THE INVENTION

The intent of this section of the specification is to briefly indicate the nature and substance of the invention, as opposed to an exhaustive statement of all subject matter and aspects of the invention. Therefore, while this section identifies subject matter recited in the claims, additional subject matter and aspects relating to the invention are set forth in other sections of the specification, particularly the detailed description, as well as any drawings.

The present invention provides, but is not limited to, electrical installations and methods for their installation and use.

According to a nonlimiting aspect of the invention, an electrical installation 10 is provided that includes an electrical box having an interior cavity, a front opening through which the interior cavity is exposed, a back wall opposite the front opening, and at least a first aperture in the back wall. The installation further includes an electrical distribution unit disposed in the electrical box adjacent the back wall thereof. The electrical distribution unit has a front side, a back side oppositely disposed from the front side, front connectors exposed on the front side, and rear connectors exposed on the back side. At least some of the front connectors are electrically connected to the rear connectors through an interior of the electrical distribution unit, and at least some of the rear connectors are accessible through the first aperture in the back wall of the electrical box. An electrical component installed on the electrical box. The electrical component has component connectors that are electrically connected to the front connectors of the electrical distribution unit to electrically connect the electrical component to the electrical distribution unit. An electrical connector unit is removably connected to the rear connectors of the electrical distribution unit through the first aperture in the back wall of the electrical box. The electrical connector unit has connector unit connectors electrically connected to the rear connectors of the electrical distribution unit, and the electrical connector unit are configured to connect electrical wires to the connector unit connectors. The front connectors and the rear connectors of the electrical distribution unit conduct electricity between the electrical wires and the electrical component.

According to another aspect of the invention, a method is provided for using an electrical installation as described above. The method includes connecting the electrical wires to the connector unit connectors of the electrical connector unit, installing the electrical distribution unit into the interior cavity of the electrical box, plugging the electrical connector unit into the back side of the electrical box to connect the electrical wires to the rear connectors of the electrical distribution unit, installing the electrical box on a structure of a building and plugging the electrical component connectors of the electrical component into the front connectors of the electrical distribution unit such that an electrical circuit is formed by the electrical wires, the electrical connector unit, the electrical distribution unit, and the electrical component.

Technical aspects of electrical installations and methods as described above preferably include the ability to provide the same or similar functionality as existing electrical boxes for electrical components while eliminating the requirement to route electrical wires through and into the interior of the electrical box itself, as such wires are replaced by the electrical distribution unit into which the wiring and electrical component are plugged.

These and other aspects, arrangements, features, and/or technical effects will become apparent upon detailed inspection of the figures and the following description.

DETAILED DESCRIPTION OF THE INVENTION

Figures 1A, 1B:
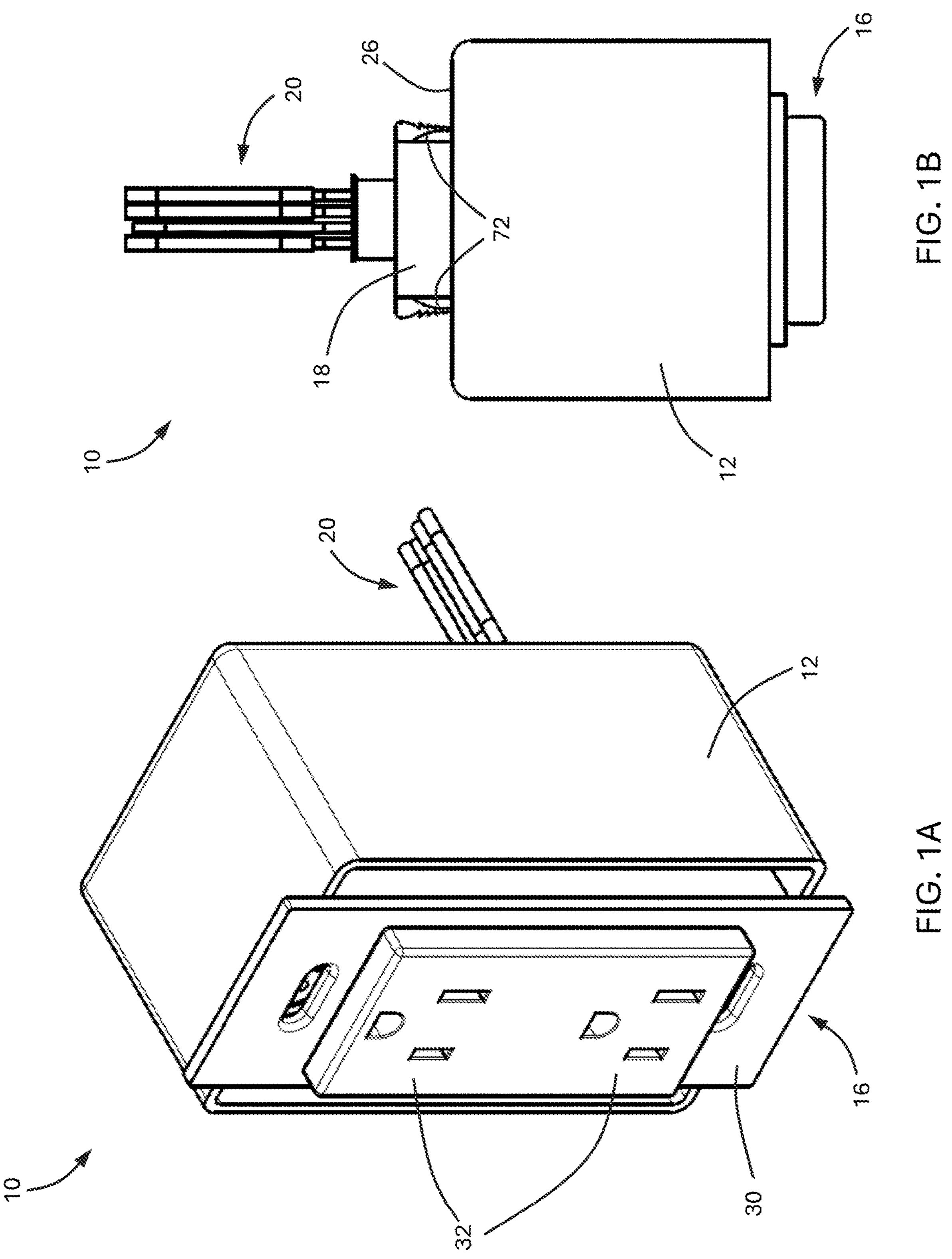
FIGS. 1A and 1B are, respectively, perspective and top views of a nonlimiting embodiment of an electrical installation that includes an electrical box, an electrical component (outlet) for installation on the electrical box, a connector unit (seen in FIG. 1B) coupled to a back wall of the electrical box, and wiring electrically connected to the electrical box with the connector unit for supplying electricity to the electrical component.

The intended purpose of the following detailed description of the invention and the phraseology and terminology employed therein is to describe what is shown in the drawings, which depict and/or relate to one or more nonlimiting embodiments of the invention, and to describe certain but not all aspects of the embodiment(s) depicted in the drawings. The following detailed description also identifies certain but not all alternatives of the embodiment(s) depicted in the drawings. As nonlimiting examples, the invention encompasses additional or alternative embodiments in which one or more features or aspects shown and/or described as part of a particular embodiment could be eliminated, and also encompasses additional or alternative embodiments that combine two or more features or aspects shown and/or described as part of different embodiments. Therefore, the appended provisional claims, and not the detailed description, are intended to recite particularly point out subject matter regarded to be aspects of the invention, including certain but not necessarily all of the aspects and alternatives described in the detailed description.

To facilitate the description provided below of the embodiment(s) represented in the drawings, relative terms, including but not limited to, "proximal," "distal," "anterior," "posterior," "vertical," "horizontal," "lateral," "front," "rear," "side," "forward," "rearward," "top," "bottom," "upper," "lower," "above," "below," "right," "left," etc., may be used in reference to the orientation of an electrical installation 10 during its use and/or as represented in the drawings. All such relative terms are useful to describe the illustrated embodiment(s) but should not be otherwise interpreted as limiting the scope of the invention.

Figures 2A, 2B:
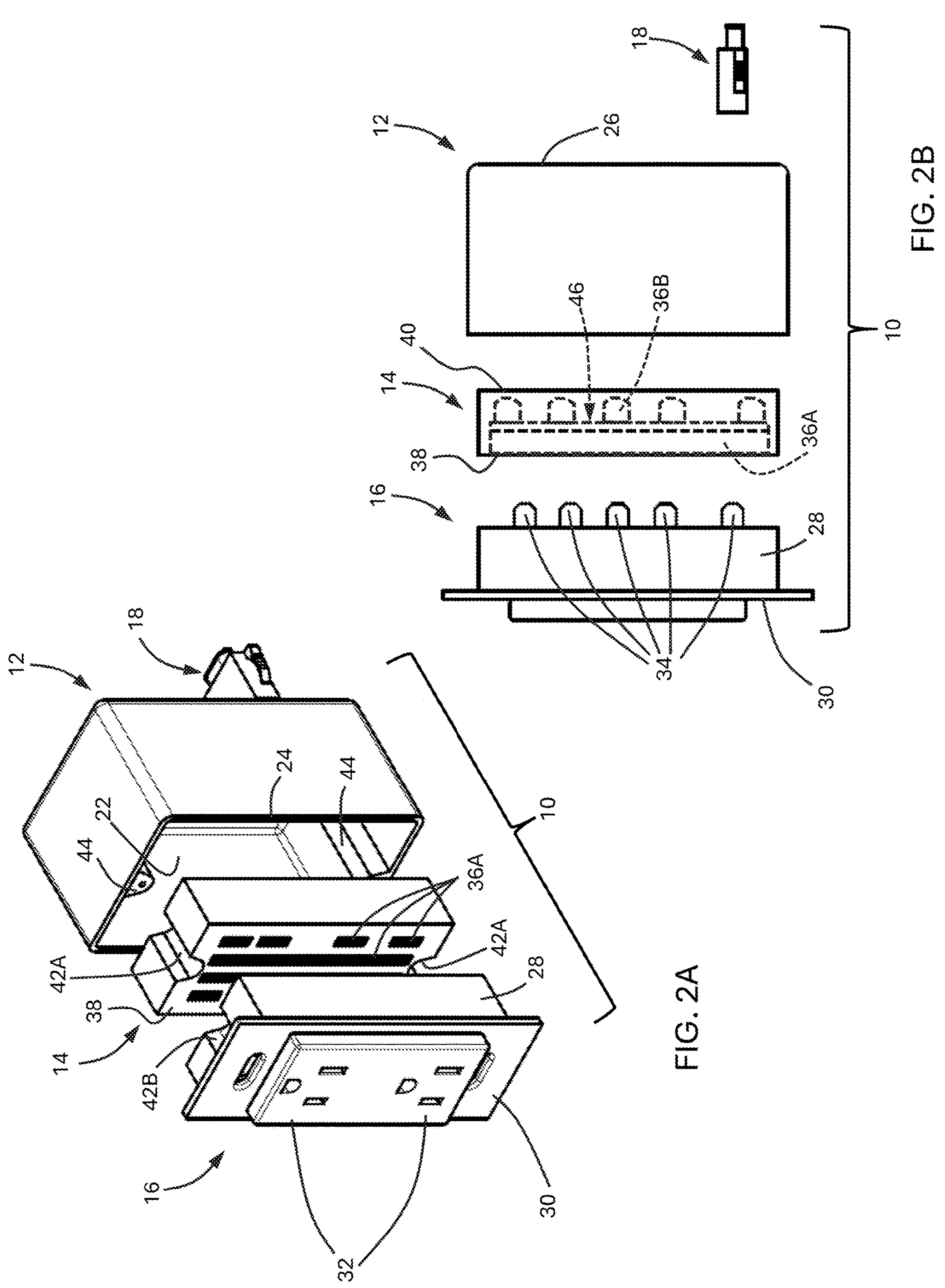
FIGS. 2A and 2B are exploded perspective and side views, respectively, of the electrical installation of FIGS. 1A and 1B, and further depict the electrical installation as including an electrical distribution unit.
Figure 3:
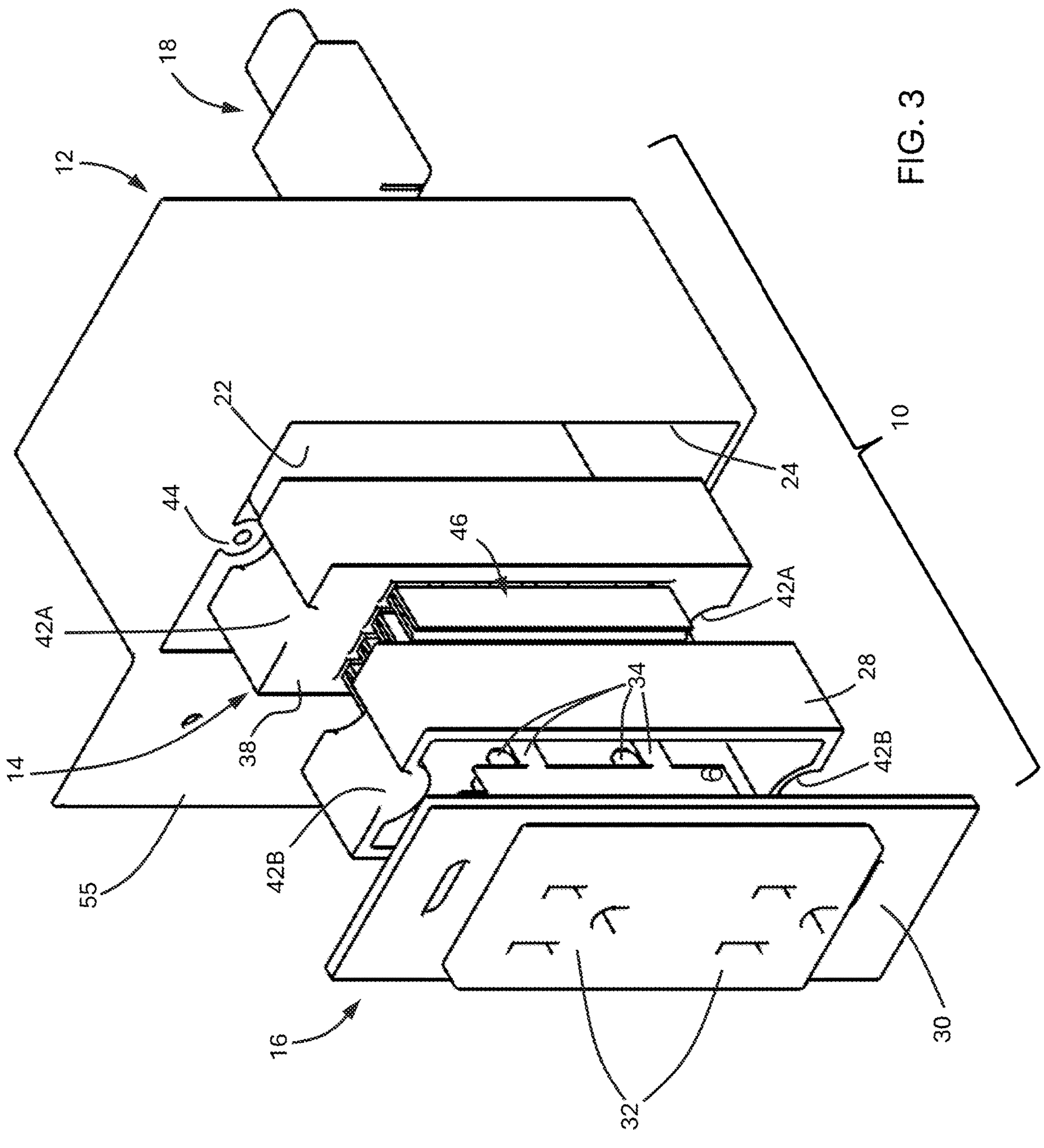
FIG. 3 is a further exploded perspective view of the electrical installation of FIGS. 1A through 2B.
Figures 2A, 4, 5:
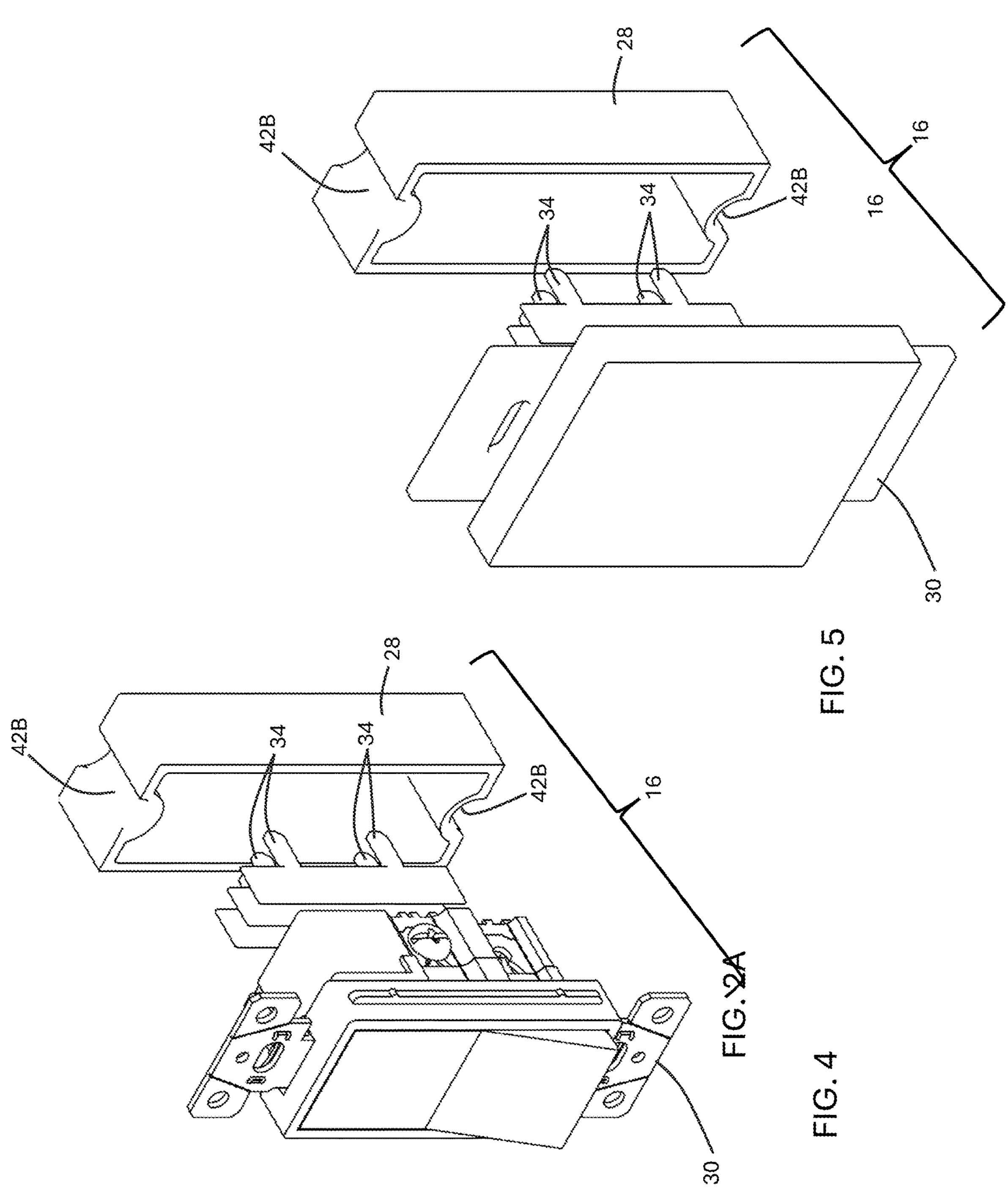
FIGS. 4 and 5 are perspective views of additional nonlimiting embodiments of electrical installations such as shown in FIGS. 1A and 1B, wherein the electrical component for installation on the electrical box is a switch and light fixture, respectively.

According to a nonlimiting aspect of the invention, FIG. 1 through 3 schematically represent an electrical installation 10 comprising an electrical box 12, an electrical distribution unit 14 within an interior cavity 22 of the box 12 (FIGS. 2A through 3), an electrical component 16 configured to be installed on the box 12, a connector unit 18 coupled to a back wall 26 of the electrical box 12 that defines an external surface of the box 12, and wires (wiring) 20 electrically connected to the electrical box 12 with the connector unit 18 for supplying electricity to the electrical component 16. The electrical component 16 is represented as being mounted to the box 12 with a face plate 30 spanning a front opening 24 in the box 12 that provides access to an interior cavity 22 within the box 12, and as having a component housing 28 that protrudes from the face plate 30 and is received within the cavity 22 of the box 12. Though the electrical component 16 is represented as an electrical outlet (receptacle) with sockets 32, it will be appreciated from the following discussion that other components could be used in combination with the box 12 in addition to or in place of an outlet, as nonlimiting examples, an electrical switch and a light fixture represented in FIGS. 4 and 5, respectively.

The electrical distribution unit 14 may be separately manufactured and then affixed to the back wall 26 of the electrical box 12, or integrally embedded or otherwise incorporated into the back wall 26 of the box 12. FIGS. 2A, 2B, and 3 schematically represent that the electrical component 16 physically and electrically engages with the electrical distribution unit 14, thereby affixing the electrical component 16 to the electrical box 12. The electrical distribution unit 14 provides a means by which the wires 20 may be physically connected to the box 12 and also electrically connected to the electrical distribution unit 14 to provide incoming and outgoing power to the electrical component 16. In this manner, the wires 20 physically and electrically connected to the electrical distribution unit 14 are also electrically connected to the electrical component 16, thereby providing power to the electrical component 16 and any appliance that is plugged into the sockets 32 of the electrical component 16. As such, the electrically installation 10 is capable of providing the same or similar functionality as conventional electrical boxes and outlets without the need for routing the wires 20 through and into the interior cavity 22 of the box 12, conferring significant advantages in time, utility, and safety.

FIGS. 2A, 2B, and 3 provide exploded views of the electrical installation 10. Specifically, the electrical distribution unit 14 and electrical component 16 are physically and electrically disconnected from the box 12 in FIGS. 2A, 2B, and 3 to provide a clearer illustration of the elements and the means by which they are meant to engage with each other. For example, the electrical component 16 can be seen in FIGS. 2B and 3 to comprise component connectors 34, represented as male connectors 34 (e.g., pins, spades, or any other suitable connectors) that protrude from the component housing 28. The male connectors 34 are sized and arranged to be received in front connectors 36A, represented as female connectors 36A in FIG. 2A, as exposed in a front side 38 of the electrical distribution unit 14 to provide electrical connection therebetween. The electrical distribution unit 14 can be seen in FIGS. 2B and 3 to comprise electrically conductive rails 46, referred to herein as busbars 46, disposed interiorly of the body of the electrical distribution unit 14. In the nonlimiting embodiment shown in FIG. 3 (and also FIGS. 9A, 9B, and 9C), each busbar 46 is an elongate rail with a slot formed in a front edge of the busbar 46 to define the female connectors 36A shown in FIG. 2A as exposed at the front side 38 of the electrical distribution unit 14, and with flanges spaced apart along a rear edge of the busbar 46 and protruding therefrom to define rear connectors 36B, represented as male connectors 36B (e.g., pins, spades, or any other suitable connectors), that are exposed at a back side 40 of the electrical distribution unit 14. As shown in FIGS. 9A, 9B, 9C, and 10, the male connectors 36B are sized and arranged to couple with connectors 52 of the connector unit 18. As represented in the drawings, the connectors 52 of the connector unit 18 are represented as female connectors 52 that receive the male connectors 36B. As evident, the female connectors 36A are separated from each other by portions of the body of the electrical distribution unit 14, and the male connectors 36B are separated from each other by portions of the body of the electrical distribution unit 14, such that each female and male connector 36A and 36B of the electrical distribution unit 14 is generally associated with a socket in the front side 38 or back side 40 of the distribution unit 14. The configuration shown in the drawings can be achieved in various manners, as a nonlimiting example, the busbars 46 may be embedded in the electrical distribution unit 14 by injection molding, or the front side 38 and/or back side 40 of the distribution unit 14 may be modified to allow the busbars 46 to be inserted into the distribution unit 14 through its front side 38 and/or back side 40.

With the electrical distribution unit 14 is assembled to the interior cavity 22 of the box 12, the front side 38 of the electrical distribution unit 14 is exposed in which case the female connectors 36A are directly exposed within the box 12 for connection to the male connectors 34 of the electrical component 16. Alternatively, if the electrical distribution unit 14 is an integral part of the box 12, for example, embedded in the back wall 26 of the box 12, would be visible are sockets in the back wall 26 of the box 12 through which the male connectors 34 of the electrical component 16 pass to connect with the female connectors 36A of the electrical distribution unit 14 within the back wall 26. The electrical distribution unit 14 is represented as having grooves 42A at its upper and lower surfaces so that during assembly with the box 12 the electrical distribution unit 14 self-aligns with respect to the box 12 by engaging complementary ribs 44 protruding into the box cavity 22 from upper and lower walls of the electrical box 12. Likewise, during assembly of the electrical component 16 with the box 12, grooves 42B formed in the upper and lower surfaces of the housing 28 of the electrical component 16 engage the complementary ribs 44. The ribs 44 of the electrical box 12 are represented as each having a bore 48 by which the electrical component 16 can be secured to the box 12 with screws or any other suitable means.

Figure 6B:
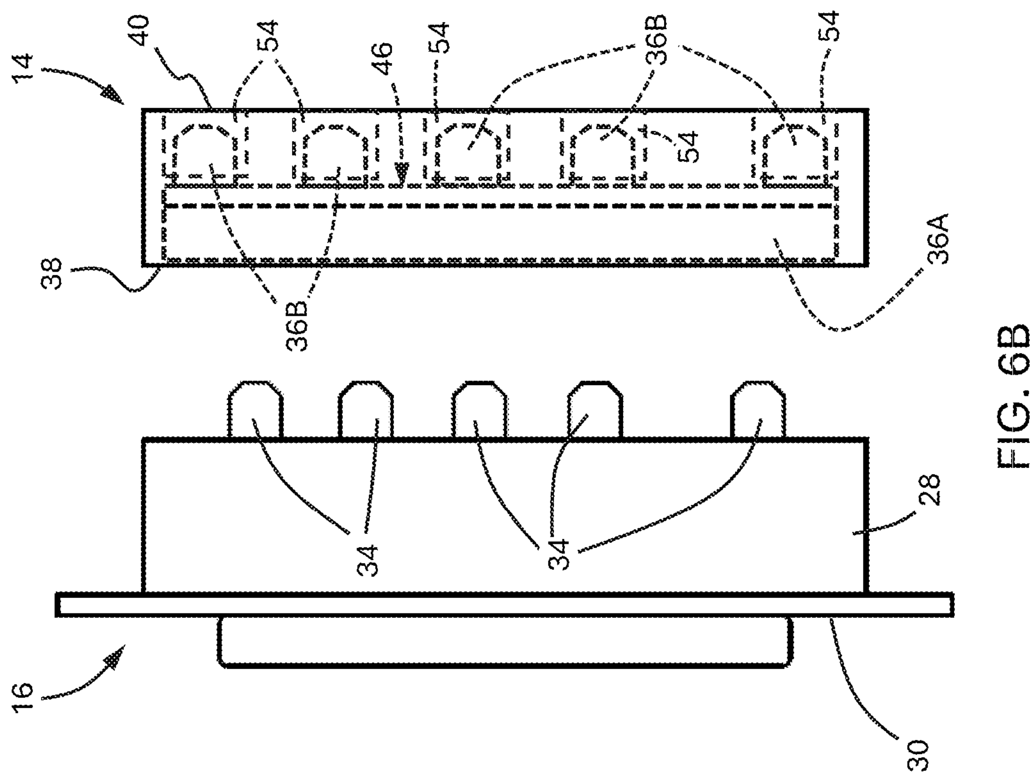
FIGS. 6A and 6B are, respectively, perspective and side views of the electrical component (outlet) arranged for assembly with the electrical distribution unit of the electrical installation of FIGS. 1A through 3.
Figure 6A:
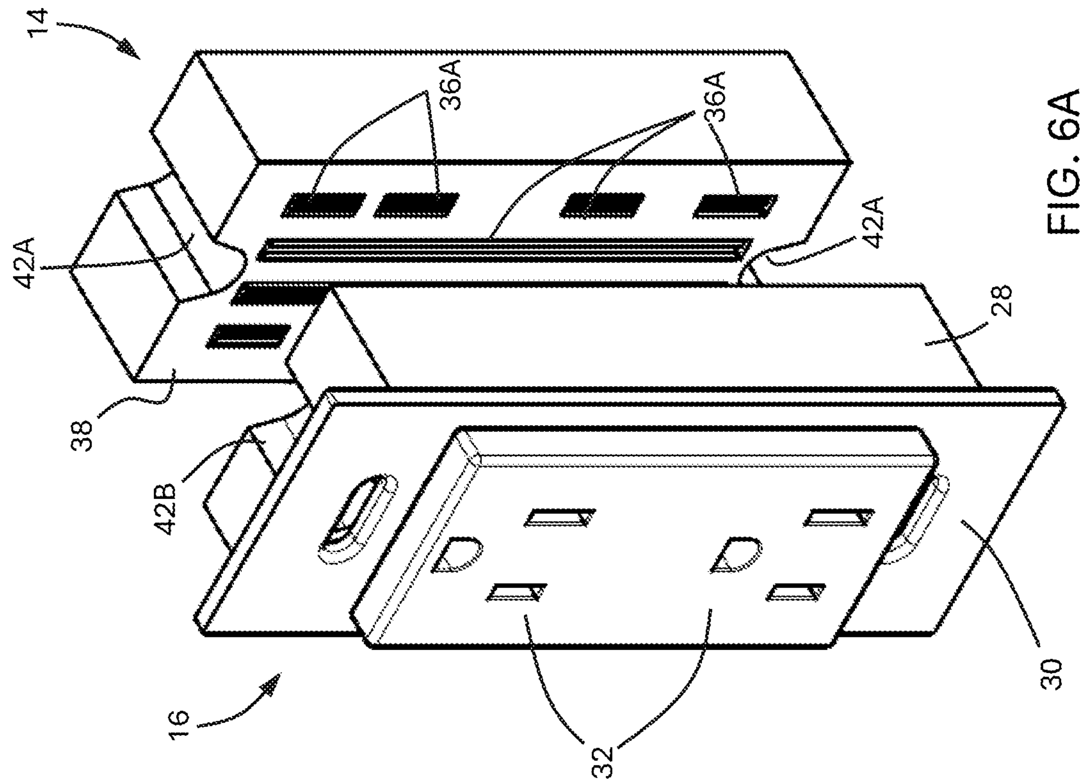
Figure 7:
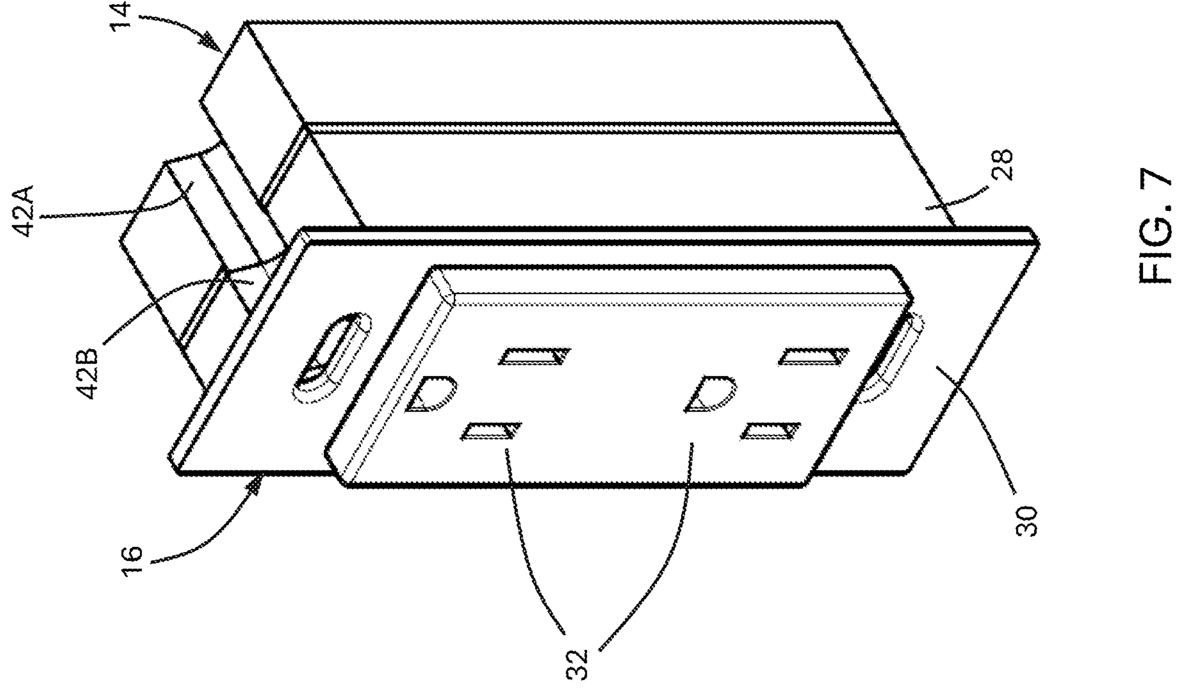
FIG. 7 is a perspective view of the electrical component (outlet) assembled with the electrical distribution unit of FIGS. 6A and 6B.

FIGS. 6A, 6B and 7 show the electrical distribution unit 14 and the electrical component 16 in isolation. FIGS. 6A and 6B show the electrical distribution unit 14 and the electrical component 16 arranged for assembly, and FIG. 7 show the electrical distribution unit 14 and the electrical component 16 following their assembly. As evident from FIG. 7, the body of the electrical distribution unit 14 and the body and the housing 28 of the electrical component 16 may have identical peripheral shapes.

Figure 8B:
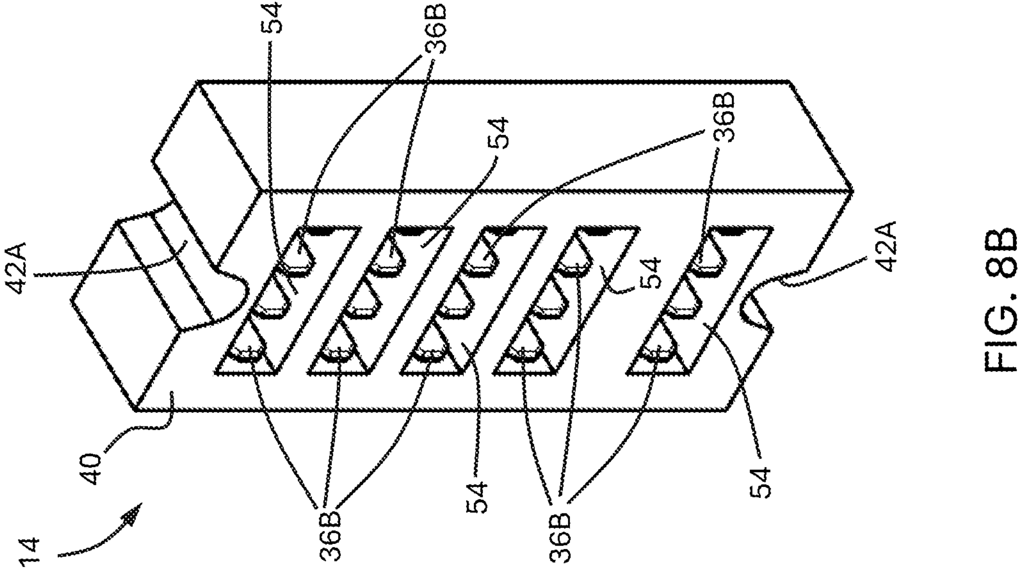
FIGS. 8A and 8B are perspective views showing front and back sides of the electrical distribution unit shown in preceding drawings.
Figure 8A:
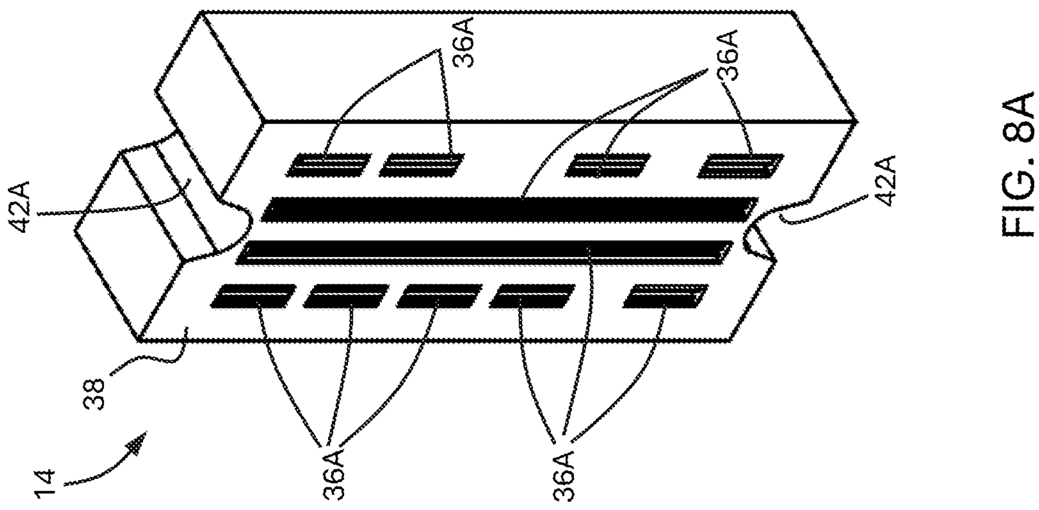
Figures 9A, 9B, 9C:
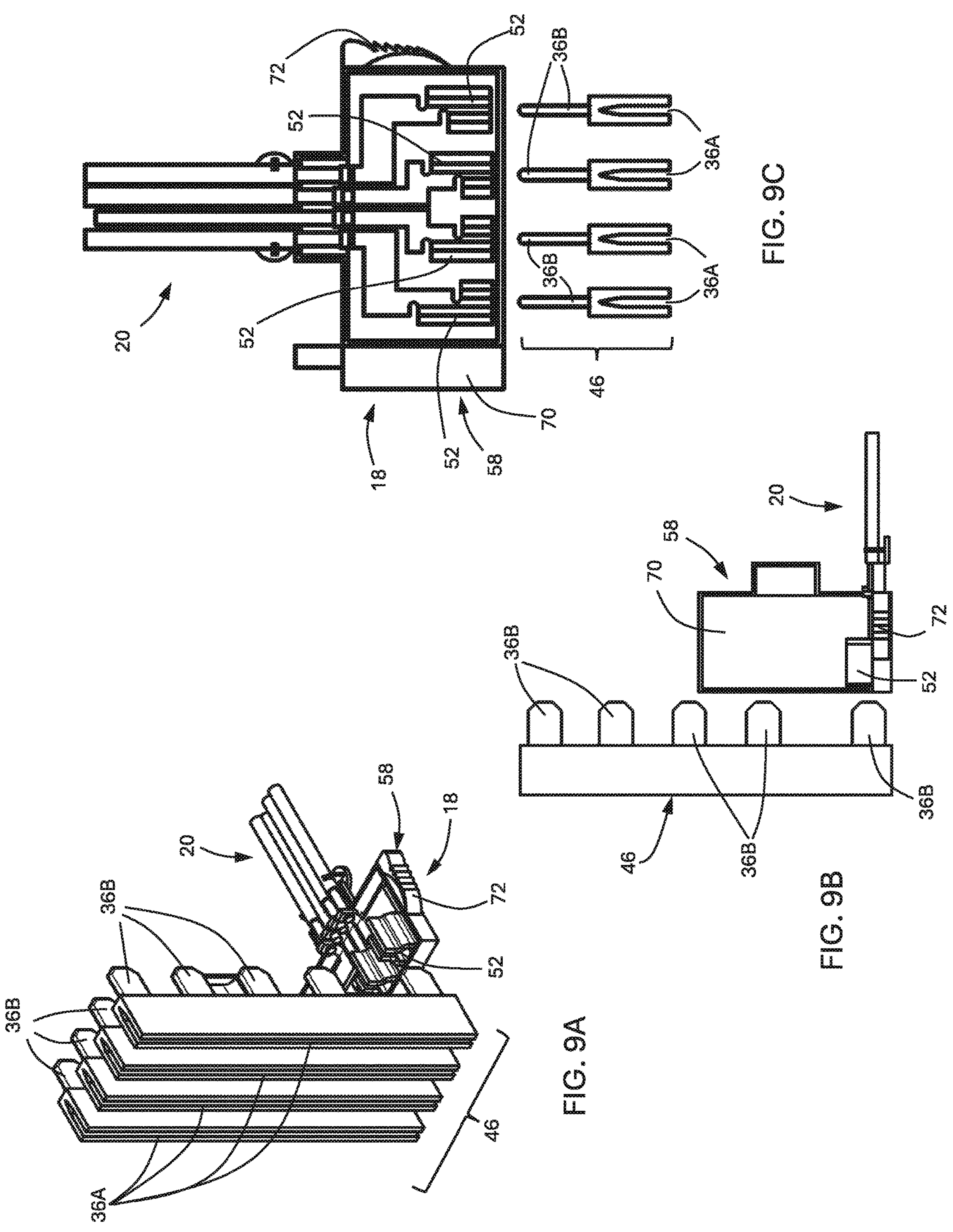
FIGS. 9A, 9B, and 9C depict, respectively, perspective, side, and top views of the connector unit of the electrical installation of FIGS. 1A through 3, arranged for electrical connection to busbars of the electrical distribution unit of FIGS. 8A and 8B.
Figure 10:
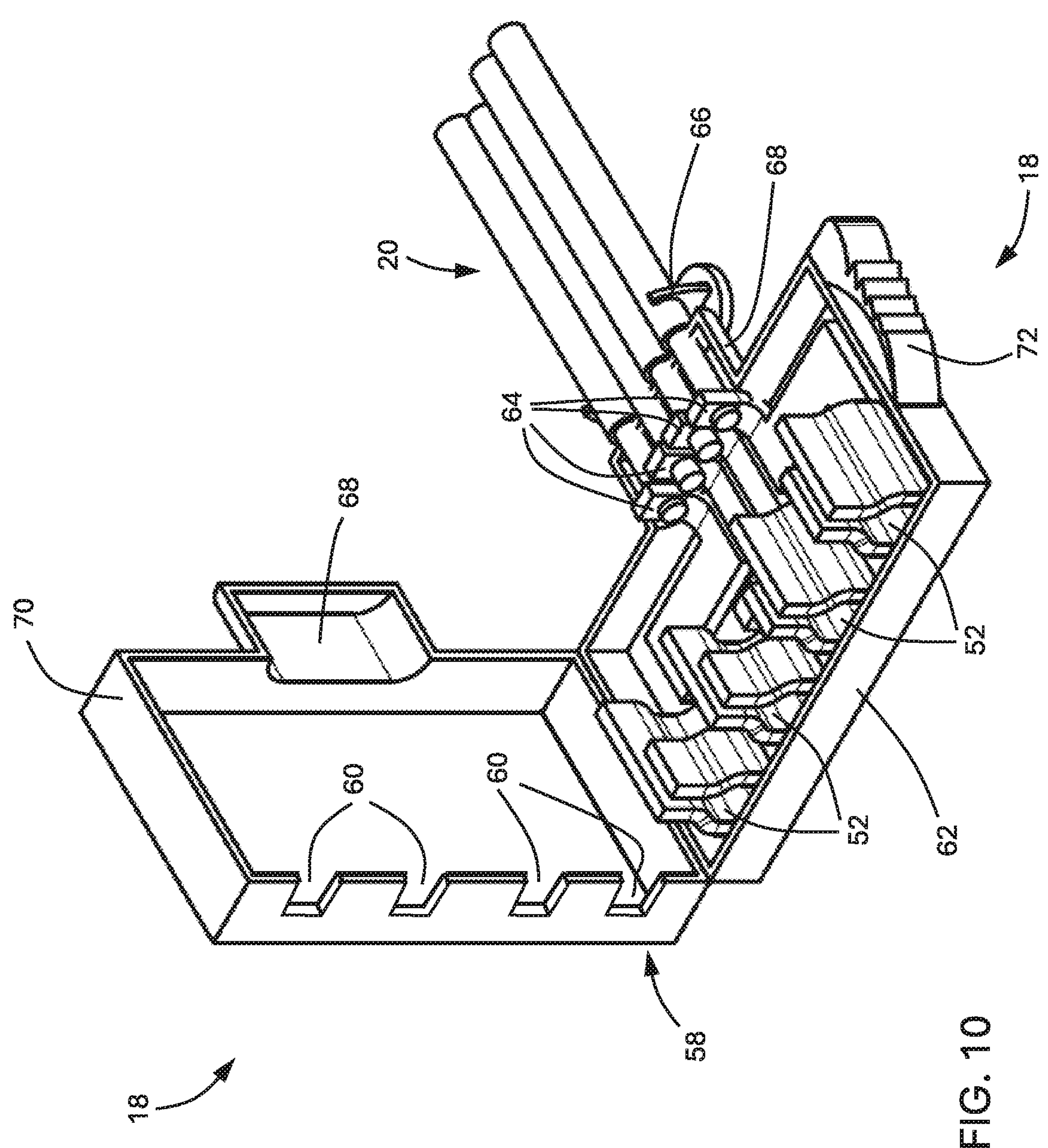
FIG. 10 is a perspective view of the connector unit of FIGS. 9A, 9B, and 9C.

FIGS. 8A and 8B show the electrical distribution unit 14 in isolation, with the front side 38 and the back side 40 of the electrical distribution unit 14 visible in FIGS. 8A and 8B, respectively. As evident from FIG. 8B, the male connectors 36B on the back side 40 of the electrical distribution unit 14 are arranged in sets within separate sockets 54 defined in the back side 40 of the distribution unit 14. The sockets 54 are each sized and shaped to be complementary to the connector unit 18, such that the connector unit 18 can be plugged into any of the sockets 54 to electrically connect with the male connectors 36B associated with that socket 54.

FIGS. 9A, 9B, 9C, and 10 represent a manner by which the wires 20 can be connected to the connector unit 18 and the connector unit 18 can be connected to the busbars 46 (shown in isolation) of the electrical distribution unit 14. The connector unit 18 comprises a connector housing 58 in which the female connectors 52 of the connector unit 18 are fully enclosed, with access to the female connectors 52 limited to slots 60 in a front wall 62 of the housing 58. The wires 20 are inserted into the housing 58, guided into female connectors 64 by saddles 66 formed in a cap lock 68. The housing 58 is represented as having a clamshell configuration with a lid 70 such that closure of the lid 70 clamps the wires 20 against their respective saddles 66 and, in so doing, secures the wires 20 within their respective female connectors 64. The housing 58 further has lock tabs 72 by which the connector unit 18 is able to be releasably secured to a socket 54 in which it has been inserted.

The wires 20, which preferably include individual wires designated as power-in wiring or power-out wiring, may be conventionally part of the wiring infrastructure of a building and routed within a wall of the building in which the electrical box 12 is to be installed in a manner similar to conventional electrical boxes. In contrast to conventional wiring, the power-in wiring and power-out wiring plug into the electrical distribution unit 14 through the back wall 26 of the box 12, such that the wires 20 are physically connected to the box 12 and physically and electrically connected to the male connectors 36B of the electrical distribution unit 14 exposed or otherwise accessible from the exterior of the box 12 via apertures 56 in the back wall 26 of the box 12. It should be noted that "power-in" wiring and "power-out" wiring are delineated herein simply to describe that both wiring functions (which encompass traveler wiring between the box 12 and another electrical box) may connect to the electrical distribution unit 14, thereby powering the electrical component 16 and completing an electrical circuit. The actual configuration of external wiring may change depending on physical and electrical considerations of the user, and the present examples described herein should be considered nonlimiting. Furthermore, it should be noted that the wires 20 shown in the drawings are simply cutoff representations of the extensive wiring forming the power infrastructure of a structure and are not shown in their entirety for the sake of clarity.

Figures 11A, 11B:
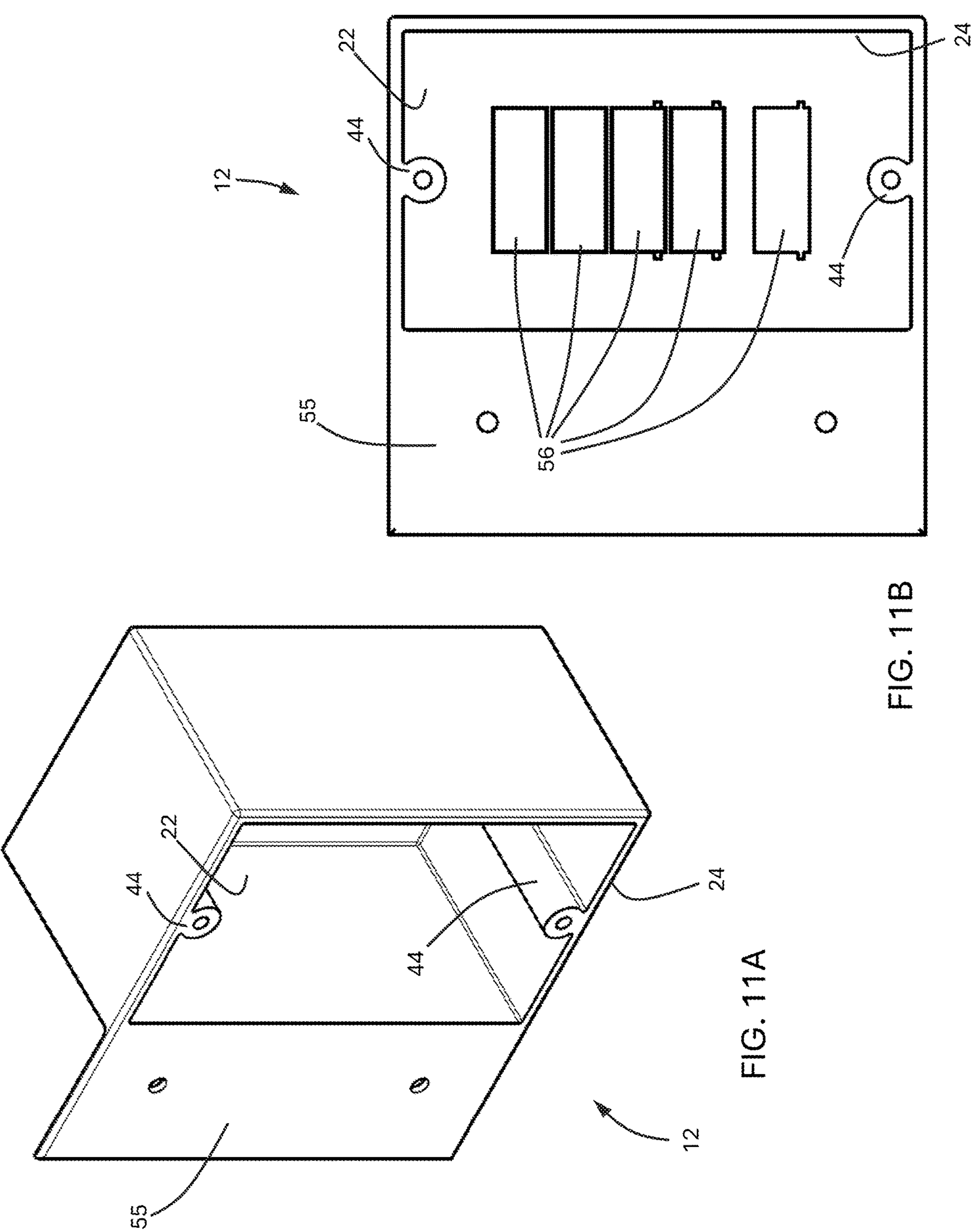
FIGS. 11A and 11B are, respectively, perspective and rear views of the electrical box of the installation.

The electrical box 12 is represented in the drawings as having a conventional cuboid shape with rectangular sides and the back wall 26, though such a configuration is not required. The electrical box 12 is further represented as comprising a flange 55 as means for affixing the electrical box 12 to a structure of a building. The back wall 26 of the box 12 is seen in FIG. 11B as having the aforementioned apertures 56 that are aligned with the sockets 54 of the electrical distribution unit 13 to enable the connector unit 18 to be plugged into any one of the sockets 54 through a corresponding aperture 56. The apertures 56 may be closed with removable plugs so that male connectors 36B of the electrical distribution unit 14 that are not required for an installation remain concealed and electrically isolated from the back side 26 of the box 12.

It should be appreciated that the electrical box 12 shown in the drawings could be utilized as a junction box, wherein electrical connections between different wiring runs plugged into the external connectors of the box are electrically interconnected with jump wiring plugged into the internal connectors within the box. As such, an electrical installation 10 utilizing the electrical box 12 and its electrical distribution unit 14 is capable of providing the same or similar functionality as conventional electrical boxes without the need for routing wiring (e.g., wires 20) through and into the interior cavity 22 of the box 12, conferring significant advantages in time, utility, and safety.

The electrical distribution unit 14*s* represented in the drawings preferably have a construction by which the female and male connectors 36A and 36B are electrically connected as a result of being defined as integral features of the busbars 46 to allow any one or more of the male connectors 36B to deliver electrical power to an electrical component, such as the outlet, switch, light bulb, etc., shown in the drawings. The male connectors 34 of such an electrical component 16 engage with the female connectors 36A of the electrical distribution unit 14, the wires 20 are electrically coupled to the male connectors of the electrical distribution unit 14 through the connector unit 18, and the busbars 46 within the electrical distribution unit 14 serve as electrical conductors that interconnect the female and male connectors 36A and 36B of the electrical distribution unit 14.

There are various advantages associated with electrical installations as described above and represented in the drawings. The lack of loose wiring within the electrical box 12 eliminates the need for tying wires together, thereby providing advantages in time efficiency and reducing or eliminating the possibility of electric sparks caused by frayed or disorganized wiring. Additionally, by inserting the tips of the wires 20 directly into the connector unit 18, plugging the connector unit 18 into any of the sockets 54 associated with the male connectors 36B of the electrical distribution unit 14, and plugging the male connectors 34 of the electrical component 16 directly into the female connectors 36A of the electrical distribution unit 14 to complete circuits that provide power to the electrical component 16, the likelihood of incorrect wiring is significantly or entirely reduced, regardless of the skill level of the user. By eliminating the requirement to accommodate wiring within the box 12, the electrical distribution unit 14 also enables the depth of the box 12 to be reduced and yet provide the same functions as a conventional electrical box, thereby conserving valuable space within a structure into which the installation 10 is to be installed.

The female and male connectors 36A and 36B and their internal electrical connections through the busbars 46 within the electrical distribution unit 14 also significantly reduce the risk of electrical fires, electrocution, or incorrect wiring within the box 12. Furthermore, by effectively color-coding or labeling the female and male connectors 36A and 36B of the electrical distribution unit 14, users know exactly where external wiring must be placed and how to affix the electrical component 16 to the electrical box 12. As a result, significant advantages in time efficiency and safety are conferred and the skill required to effectively and safely install or modify power outlets is significantly reduced.

Various alterations or adaptations of the present aspect of the invention are encompassed within the scope of the invention. For example, the electrical component 16 may be permanently constructed as part of the electrical distribution unit 14, eliminating the requirement for their male connectors 34, their functions being accomplished by the male connectors 36B of the electrical distribution unit 14. Furthermore, the arrangement and placement of the male and female connectors within the installation 10 could differ, e.g., by substituting male connectors for female connectors and vice versa.

As noted above, the electrical distribution unit 14 may be irremovable from the electrical box 12. That is, the electrical distribution unit 14 may simply be embedded within or entirely form the back wall 26 (or a different wall) of the box 12. Conversely, the electrical distribution unit 14 may be permanently attached to the electrical box 12 or may be some removable element affixed to the box 12. This may allow various electrical distribution units 14 having different internal and external connector configurations to be installed on the same standardized box, providing adaptability depending on the physical constraints of the space into which the entire electrical installation 10 is fitted.

In view of the above, the electrical installation 10 represented in the drawings provides electrical wiring methods that entail connecting power supply wires 20 to external connectors (e.g., male connectors 36B) of the electrical distribution unit 14 at the exterior of the electrical box 12, affixing the electrical box 12 to a structure, and connecting an electrical component 16 to the electrical box 12 such that the circuits formed by the external wires 20, electrical distribution unit 14, and electrical component 16 are closed and the electrical component 16 can be used as intended, for example, in the case of an outlet to provide power to an appliance plugged into sockets of the outlet. A similar installation 10 method is entailed in cases where a switch or light bulb is installed in place of an outlet.

Electrical distribution units 14 suitable for use with the invention can have a variety of configurations. In general, such an electrical distribution unit 14 may be a block of a plastic or some other nonconductive material. The female and male connectors 36A and 36B of such an electrical distribution unit 14 may utilize clips (also known as tie points or contact points) which promote electrical connection thereto and may grip the wires 20 or complementary connectors of the electrical component 16 and connector unit 18 to prevent inadvertent disconnection from the electrical distribution unit 14. Circuits may therefore be completed entirely within the physical structure of the electrical distribution unit 14 without the need for complicated ties or wiring.

As previously noted above, though the foregoing detailed description describes certain aspects of one or more particular embodiments of the invention, alternatives could be adopted by one skilled in the art. As such, it should be understood that the invention is not necessarily limited to any particular embodiment described herein or illustrated in the drawings.

The invention claimed is:

1. An electrical installation comprising:

an electrical box having an interior cavity, a front opening through which the interior cavity is exposed, a back wall opposite the front opening, and at least a first aperture in the back wall;

an electrical distribution unit disposed in the electrical box adjacent the back wall thereof, the electrical distribution unit having a front side, a back side oppositely disposed from the front side, front connectors exposed on the front side, and rear connectors exposed on the back side, wherein at least some of the front connectors are electrically connected to the rear connectors through an interior of the electrical distribution unit, at least some of the rear connectors being accessible through the first aperture in the back wall of the electrical box;

an electrical component installed on the electrical box, the electrical component having component connectors that are electrically connected to the front connectors of the electrical distribution unit to electrically connect the electrical component to the electrical distribution unit; and an electrical connector unit mounted externally of the interior cavity of the electrical box and removably connected to the rear connectors of the electrical distribution unit through the first aperture in the back wall of the electrical box, the electrical connector unit having a connector housing and connector unit connectors within the connector housing that are electrically connected to the rear connectors of the electrical distribution unit, the electrical connector unit being mounted and configured to physically secure electrical wires to the electrical box and connect the electrical wires to the connector unit connectors within the connector housing without the electrical wires being routed into the interior cavity of the electrical box;

wherein the front connectors and the rear connectors of the electrical distribution unit conduct electricity between the electrical wires and the electrical component.

2. The electrical installation of claim 1, wherein the electrical distribution unit is incorporated into the electrical box as an inseparable part of the electrical box.

3. The electrical installation of claim 1, wherein the electrical distribution unit is a separate component relative to the electrical box and adapted to be installed and removed from the electrical box.

4. The electrical installation of claim 1, wherein the front connectors of the electrical distribution unit are female connectors and the component connectors of the electrical component are male connectors inserted into the front connectors.

5. An electrical installation comprising:

an electrical box having an interior cavity, a front opening through which the interior cavity is exposed, a back wall opposite the front opening, and at least a first aperture in the back wall;

an electrical distribution unit disposed in the electrical box adjacent the back wall thereof, the electrical distribution unit having a front side, a back side oppositely disposed from the front side, front connectors exposed on the front side, and rear connectors exposed on the back side, wherein at least some of the front connectors are electrically connected to the rear connectors through an interior of the electrical distribution unit, at least some of the rear connectors being accessible through the first aperture in the back wall of the electrical box;

an electrical component installed on the electrical box, the electrical component having component connectors that are electrically connected to the front connectors of the electrical distribution unit to electrically connect the electrical component to the electrical distribution unit; and an electrical connector unit removably connected to the rear connectors of the electrical distribution unit through the first aperture in the back wall of the electrical box, the electrical connector unit having connector unit connectors electrically connected to the rear connectors of the electrical distribution unit, the electrical connector unit being configured to connect electrical wires to the connector unit connectors wherein the front connectors and the rear connectors of the electrical distribution unit conduct electricity between the electrical wires and the electrical component; and wherein the connector unit connectors of the electrical connector unit are female connectors and the rear connectors of the electrical distribution unit are male connectors inserted into the connector unit connectors.

6. The electrical installation of claim 1, wherein the front connectors and the rear connectors are features of at least a first busbar disposed in the electrical distribution unit.

7. The electrical installation of claim 6, wherein the first busbar has oppositely-disposed first and second edges, the front connectors of the electrical distribution unit being defined by a slot in the first edge and the rear connectors of the electrical distribution unit being defined by individual flanges protruding from the second edge.

8. The electrical installation of claim 1, wherein the electrical component comprises a housing and the component connectors protrude from the housing.

9. The electrical installation of claim 8, wherein the electrical distribution unit has a body, and the body and the housing of the electrical component have identical peripheral shapes.

10. An electrical installation comprising:

an electrical box having an interior cavity, a front opening through which the interior cavity is exposed, a back wall opposite the front opening, and at least a first aperture in the back wall;

an electrical distribution unit disposed in the electrical box adjacent the back wall thereof, the electrical distribution unit having a front side, a back side oppositely disposed from the front side, front connectors exposed on the front side, and rear connectors exposed on the back side, wherein at least some of the front connectors are electrically connected to the rear connectors through an interior of the electrical distribution unit, at least some of the rear connectors being accessible through the first aperture in the back wall of the electrical box;

an electrical component installed on the electrical box, the electrical component having component connectors that are electrically connected to the front connectors of the electrical distribution unit to electrically connect the electrical component to the electrical distribution unit; and an electrical connector unit removably connected to the rear connectors of the electrical distribution unit through the first aperture in the back wall of the electrical box, the electrical connector unit having connector unit connectors electrically connected to the rear connectors of the electrical distribution unit, the electrical connector unit being configured to connect electrical wires to the connector unit connectors;

wherein the front connectors and the rear connectors of the electrical distribution unit conduct electricity between the electrical wires and the electrical component;

wherein the electrical component comprises a housing and the component connectors protrude from the housing; and wherein the electrical distribution unit and the housing of the electrical component have grooves and the electrical box has ribs complementary to the grooves that cause the electrical distribution unit and the electrical component to self-align during insertion into the interior cavity of the electrical box.

11. The electrical installation of claim 1, wherein the rear connectors on the back side of the electrical distribution unit are arranged in sets within separate sockets defined in the back side of the electrical distribution unit.

12. An electrical installation comprising:

an electrical box having an interior cavity, a front opening through which the interior cavity is exposed, a back wall opposite the front opening, and at least a first aperture in the back wall;

an electrical distribution unit disposed in the electrical box adjacent the back wall thereof, the electrical distribution unit having a front side, a back side oppositely disposed from the front side, front connectors exposed on the front side, and rear connectors exposed on the back side, wherein at least some of the front connectors are electrically connected to the rear connectors through an interior of the electrical distribution unit, at least some of the rear connectors being accessible through the first aperture in the back wall of the electrical box;

an electrical component installed on the electrical box, the electrical component having component connectors that are electrically connected to the front connectors of the electrical distribution unit to electrically connect the electrical component to the electrical distribution unit; and an electrical connector unit removably connected to the rear connectors of the electrical distribution unit through the first aperture in the back wall of the electrical box, the electrical connector unit having connector unit connectors electrically connected to the rear connectors of the electrical distribution unit, the electrical connector unit being configured to connect electrical wires to the connector unit connectors;

wherein the front connectors and the rear connectors of the electrical distribution unit conduct electricity between the electrical wires and the electrical component;

wherein the rear connectors on the back side of the electrical distribution unit are arranged in sets within separate sockets defined in the back side of the electrical distribution unit; and wherein the sockets are each sized and shaped to be complementary to the electrical connector unit such that the electrical connector unit can be plugged into any of the sockets to electrically connect with the rear connectors of one of the sets associated with any of the sockets.

13. The electrical installation of claim 1, wherein the electrical connector unit comprises a housing having a clamshell configuration and a lid that is closable to grip the electrical wires connected to the connector unit connectors.

14. The electrical installation of claim 13, wherein the rear connectors on the back side of the electrical distribution unit are arranged in sets within separate sockets defined in the back side of the electrical distribution unit, and the housing further has lock tabs by which the electrical connector unit is releasably secured to one of the sockets in which the electrical connector unit has been inserted.

15. The electrical installation of claim 1, wherein the component connectors of the electrical component and the front connectors of the electrical distribution unit physically secure the electrical component to the electrical distribution unit.

16. The electrical installation of claim 1, wherein the electrical component is an electrical outlet adapted to electrically connect with an electrical plug.

17. The electrical installation of claim 1, wherein the electrical component is an electrical switch adapted as a means by which a user may open and close an electrical circuit containing the electrical switch.

18. The electrical installation of claim 1, wherein the electrical component is a light fixture.

19. A method of using the electrical installation of claim 1, the method comprising the following steps in any order:

connecting the electrical wires to the connector unit connectors of the electrical connector unit;

installing the electrical distribution unit into the interior cavity of the electrical box;

plugging the electrical connector unit into the back side of the electrical box to connect the electrical wires to the rear connectors of the electrical distribution unit;

installing the electrical box on a structure of a building; and plugging the electrical component connectors of the electrical component into the front connectors of the electrical distribution unit such that an electrical circuit is formed by the electrical wires, the electrical connector unit, the electrical distribution unit, and the electrical component.

20. The method of claim 19, wherein the electric component is an outlet, a switch, or a light fixture.

* * * * *